United States Patent [19]

Piacenti et al.

[11] Patent Number: 4,812,095
[45] Date of Patent: Mar. 14, 1989

[54] THREADED FASTENER

[75] Inventors: Frank Piacenti; Pat Ferrante, both of Campbellsville, Ky.

[73] Assignee: Emhart Industries, Inc., Farmington, Conn.

[21] Appl. No.: 169,658

[22] Filed: Mar. 18, 1988

Related U.S. Application Data

[63] Continuation-in-part of Ser. No. 18,263, Feb. 24, 1987, abandoned.

[51] Int. Cl.$^4$ .............................................. F16B 39/282
[52] U.S. Cl. ...................................... 411/188; 411/161; 411/959
[58] Field of Search .............. 411/161, 162, 187, 188, 411/957, 958, 959, 163, 164, 165

[56] References Cited

U.S. PATENT DOCUMENTS

| | | |
|---|---|---|
| 3,389,734 | 6/1968 | Gutshall . |
| 3,540,509 | 11/1970 | Gutshall . |
| 4,220,188 | 9/1980 | McMurry . |
| 4,223,711 | 9/1980 | Tabor . |
| 4,281,699 | 8/1981 | Grube . |
| 4,289,181 | 9/1981 | Capuano . |
| 4,350,465 | 9/1982 | Louisek . |
| 4,380,414 | 4/1983 | Capuano . |
| 4,490,082 | 12/1984 | Barth . |
| 4,498,825 | 2/1985 | Pamer . |
| 4,516,893 | 5/1985 | Barth . |
| 4,518,294 | 5/1985 | Barth . |
| 4,543,023 | 9/1985 | Capuano . |
| 4,657,459 | 4/1987 | Landt . |

Primary Examiner—Neill R. Wilson
Attorney, Agent, or Firm—Thomas S. Szatkowski

[57] ABSTRACT

A threaded fastener is provided having a head for accommodating a tool for rotating the fastener. A plurality of ribs culminating in teeth are provided under the head for engaging the material into which the fastener is inserted, each rib and tooth having a ramp surface and a brake surface, the ribs being oriented for inhibiting either clockwise rotation or counter-clockwise rotation of the fastener by torque created through contact of the brake surfaces with the material. The ribs are formed on the fastener during the heading process by means of a matched die set.

7 Claims, 5 Drawing Sheets

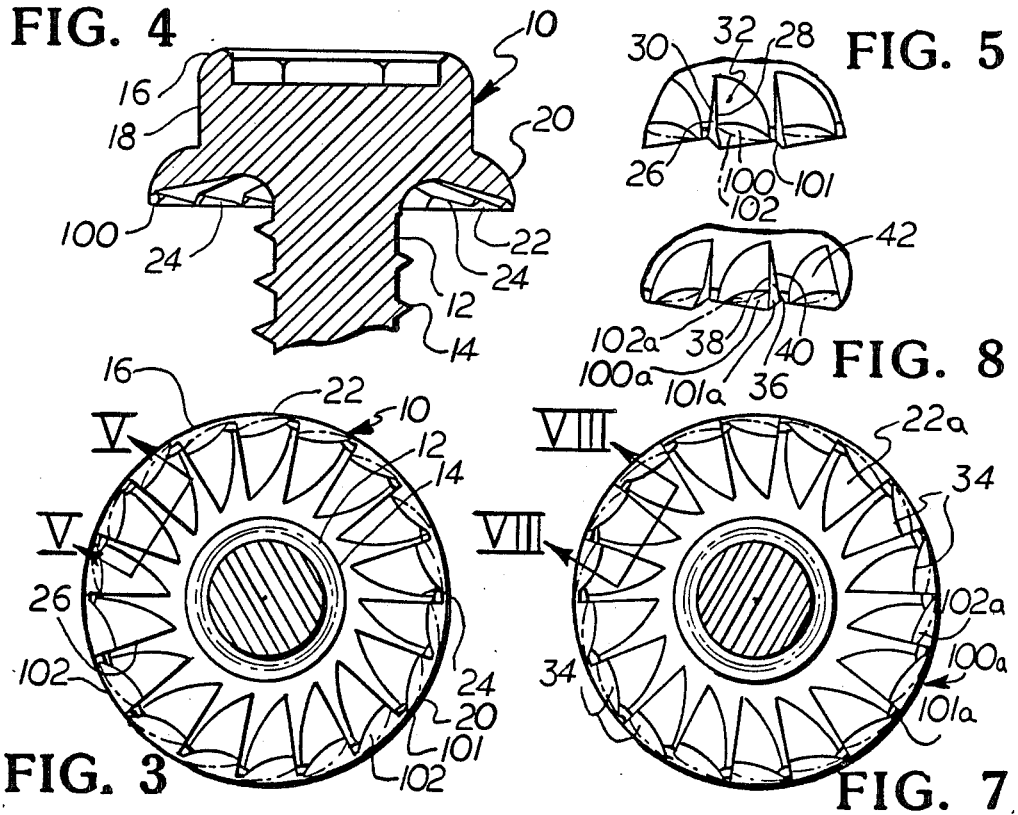

FIG. 13
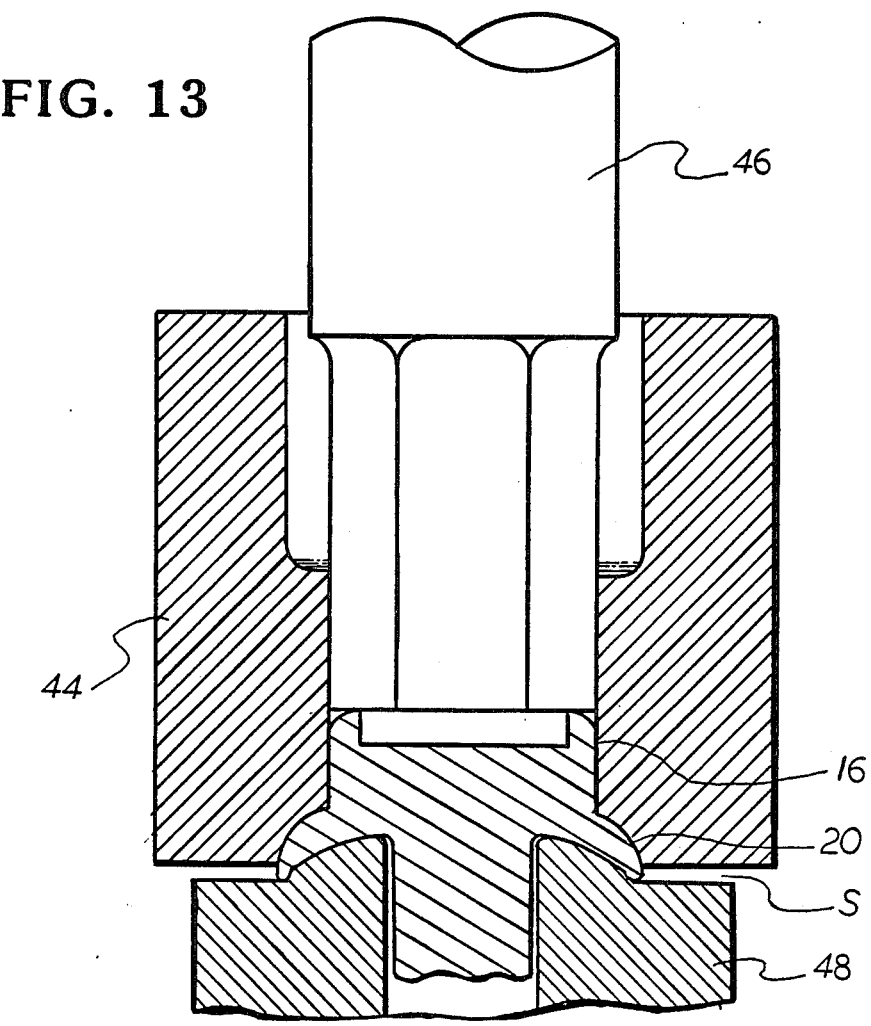
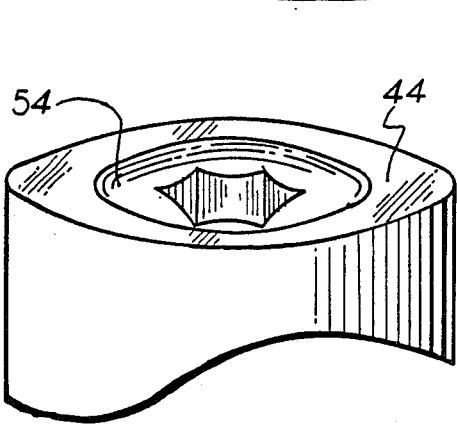
FIG. 11
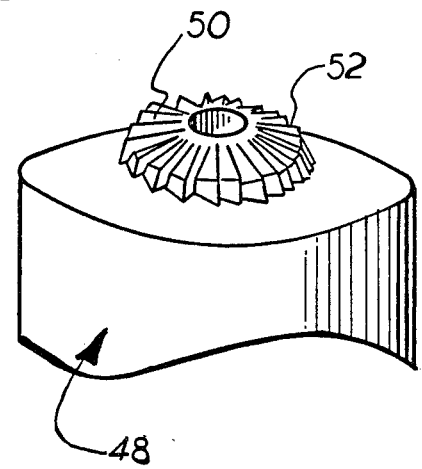
FIG. 12

THREADED FASTENER

This application is a continuation-in-part of U S. application Ser. No. 018,263 filed on Feb. 24, 1987 now abandoned.

BACKGROUND OF THE INVENTION

The present invention relates to threaded fasteners and more particular to a threaded fastener having a braking action to eliminate strip-out during application of the fastener. In addition, the present invention relates to a threaded fastener having a locking action to eliminate loosening of the fastener, after it is set in place.

In the field of threaded fasteners, and in particular, threaded fasteners to be employed with sheet materials, there is a need for a fastener which exhibits the ability to prevent strip-out of the fastened material under high torque application of the fastener. Generally, the use of power screw drivers for assembly of sheet metal structures has given rise to the need for a fastener which may be driven with a high torque setting on the driver, but which will have a braking action of a magnitude sufficient to counteract the driver torque and stop the rotation of the fastener in the workpiece prior to strip out of the threads within the workpiece.

Co-existent with this requirement, there is often the need to provide a threaded fastener which has the ability to be engaged in the workpiece or workpieces, and locked in place without the requirement for additional lock washers, either permanently attached to the fastener, or as a secondary fastening element.

Various fastener structures have been disclosed having features intended to solve the above problems typical of which are disclosed in U.S. Pat. Nos. 3,605,845 issued Sept. 20, 1971 to G. H. Junker, 3,389,734 issued June 25, 1968 to C. E. Gutshall and 4,310,272 issued Jan. 12, 1982 to Rich, et al. Many of such prior art devices have proved useful in achieving the desired results, and have been successful in the marketplace.

However, the present invention has as an object to provide an improved fastener of the type disclosed above, which is simple and less costly to manufacture than prior art fasteners which are intended to achieve a high torque braking action or the locking feature, required for a particular application.

The invention has as a further object to provide a method of manufacturing a fastener exhibiting the quality of preventing strip out, or a locking action, which method is simple and less costly than those of the prior art.

A further object of the invention is to provide a die set for manufacturing a fastener of the type set forth above which is effective to produce the above-described fastener in a single heading operation.

SUMMARY OF THE INVENTION

The above objects and other objects which will become apparent are accomplished by providing a threaded fastener comprising an elongated shank on which a helical thread form is disposed, a workpiece entering portion of the shank disposed at one end thereof and a tool accommodating head disposed at the opposite end of the shank. The head of the threaded fastener has a thread facing surface extending radially outwardly from the centerline of the shank beyond the helical thread form, and a plurality of ribs culminating in teeth are disposed on the fastener under the head circumferentially about the centerline of the shank and positioned to contact a workpiece through which the workpiece entering portion of the shank is inserted upon rotation of the helical threads in the workpiece. Each of the ribs comprises a brake surface extending radially outwardly from a point adjacent to the outer periphery of the thread facing surface of the shank and has an outer edge for contacting the workpiece and an inner edge spaced from the outer edge in a direction away from the workpiece. Each rib has a ramp surface sloping from the brake surface outer edge away from the workpiece such that the rotation of the fastener in one direction causes the ramp surface to slide along the workpiece and rotation of the fastener in the opposite direction causes the brake surfaces to penetrate the workpiece producing a braking action. Each rib increases in size in the direction of the outer periphery of the thread facing surface and culminates in a tooth-like projection located at the outer periphery of the skirt portion. Each tooth has a brake surface for contacting the workpiece and a ramp surface sloping from the brake surface away from the workpiece such that rotation of the fastener in one direction causes the ramp surface to slide along the workpiece and rotation of the fastener in the opposite direction causes the brake surface to penetrate the workpiece producing a braking action. The tooth-like projections are evenly spaced about the entire outer periphery of the skirt portion.

The invention further provides a method of manufacturing a threaded fastener comprising an elongated shank on which a helical thread form is disposed, and a workpiece entering portion of the shank disposed at one end of the shank and a tool accommodating head at the opposite end of the shank wherein the thread facing surface of the head is concave. The method comprises the steps of providing a cylindrical blank from which the fastener is to be formed and providing a die set for forming the head of the fastener and applying a force to one end of the blank while in the die set to simultaneously form the tool accommodating portion of the head and the concave thread facing surface of the head, after which the helical threads are rolled on the shank. In the manufacture of a fastener having a plurality of ribs culminating in teeth disposed under the head and spaced circumferentially about the centerline of the shank, the ribs and teeth are formed simultaneously with the head and the concave thread facing surface of the fattener.

To achieve the above, a die set is provided for manufacturing the threaded fastener comprising die means for forming the tool accommodating portion of the head and a mating die having a convex surface facing said die means whereby the die set is effective to form a concave surface under the head of the fastener simultaneously with the formation of the tool accommodating portion. When the fastener has the aforementioned ribs culminating in teeth provided on the thread facing portion of the head, the mating die has a plurality of rib forming serrations disposed on the convex surface thereof for forming the ribs and teeth under the head of the fastener.

BRIEF DESCRIPTION OF THE DRAWINGS

The above and other features of the invention, together with various novel details of construction will hereinafter be more particularly described with reference to the accompanying drawings, wherein:

FIG. 1 is a fragmentary, elevational view showing a threaded fastener embodying the present invention;

FIG. 2 is a top plan view showing the threaded fastener of FIG. 1;

FIG. 3 is a bottom plan view showing details of the structure of FIGS. 1 and 2;

FIG. 4 is an elevational sectional view taken through the centerline of the structure shown in FIG. 1;

FIG. 5 is a fragmentary sectional view taken along the line V—V of FIG. 3, showing further details of the structure of FIGS. 1 through 4;

FIG. 6 is a fragmentary elevational view similar to FIG. 1 showing an alternate embodiment of the invention;

FIG. 7 is a bottom plan view of the structure of FIG. 6 showing details of construction of the alternate embodiment of FIG. 6;

FIG. 8 is a fragmentary sectional view taken along the line VIII—VIII of FIG. 7, showing further details of the structure of FIGS. 6 and 7;

FIG. 11 is a fragmentary elevational perspective view showing a tool employed in the manufacture of the threaded fastener of FIG. 1;

FIG. 12 is a fragmentary elevational perspective view showing a tool employed with that of FIG. 11 in the manufacture of the fastener of FIG. 1;

FIG. 13 is an elevational view, partially in section showing the tools of FIGS. 11 and 12 employed in the manufacture of the threaded fastener of FIG. 1;

DESCRIPTION OF THE PREFERRED EMBODIMENT

Figure 9:
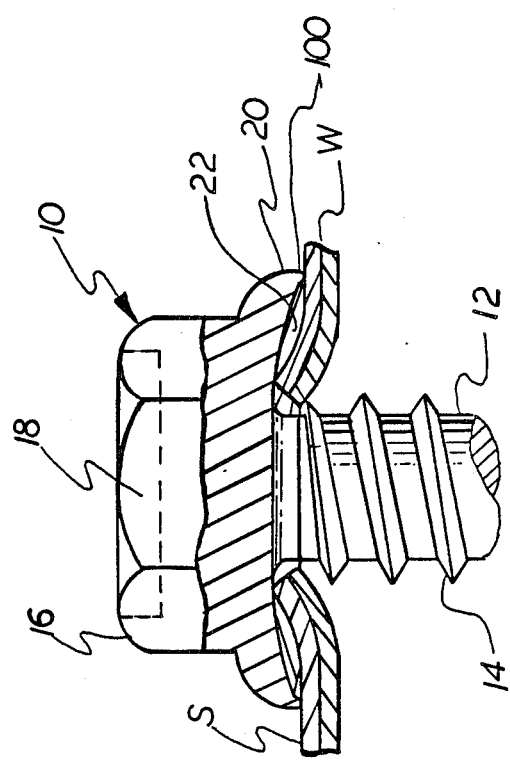
FIG. 9 is a fragmentary elevational view partially in section showing the threaded fastener of FIG. 1 being applied to a workpiece, taken on an enlarged scale for clarity.

Referring now to the drawings and in particular FIGS. 1 through 4, there is shown a threaded fastener 10 comprising an elongated shank 12 on which a helical thread form 14 is disposed. At one end of the shank 12 is a workpiece entering portion (not shown) which may be of any type well-known in the art, and preferably of the drilling and thread forming type disclosed in U.S. Pat. No. 3,395,603 issued to E. A. Skierski, which is incorporated herein by reference. At the opposite end of the shank 12 is shown a tool accommodating head 16 having a hex surface portion 18 or accommodating a hex socket during the driving operation, and a skirt portion 20 disposed between the hex portion and the thread form 14.

The head 16 further comprises a thread facing surface 22 which extends from the outer periphery of the skirt portion 20 to the shank 12, and as is shown in FIG. 4 is substantially concave in configuration about the centerline of the fastener 10. A plurality of ribs 24 culminating in teeth 100 are disposed under the head 16 of the fastener 10 and are located on the thread facing surface 22 of the fastener.

Figure 10:
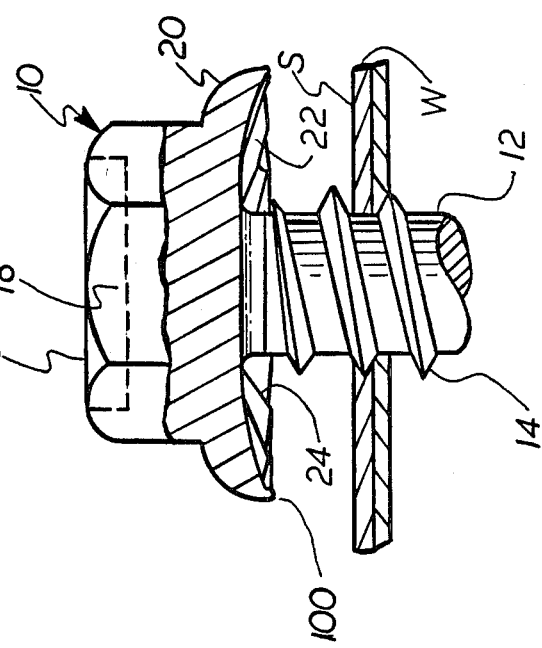
FIG. 10 is a fragmentary elevational view similar to FIG. 9, showing the threaded fastener in its set position on the workpiece.

Referring now to FIG. 5 taken in conjunction with FIGS. 1 through 4, each of the ribs 24 comprises a brake surface 26 which extends radially outwardly from the point adjacent the shank 12 to the point where the rib increases in size to form tooth-like projection 100. Tooth 100 extends to the periphery of the skirt 20 and includes a brake surface 101 for contacting the workpiece into which the fastener is inserted and a ramp surface 102. Ramp surface 102 generally has the shape of a portion of a three-dimensional ellipse. More particularly, ramp surface 102 appears to be a quartered and sectioned oblate spheroid and can be defined by rotating the line between the major and minor axis of an ellipse, i.e., one quadrant of an ellipse, 90° around the major axis. The quadrant line is thus rotated about the major axis from the plane of the ellipse to the perpendicular plane which passes through the major axis. Ramp surface 102 faces toward the shank 12 of fastener 10. The brake surface 26 of ribs 24 has an outer edge 28 for contacting the workpiece into which the threaded fastener 10 is inserted, and an inner edge 30 spaced from the outer edge in a direction away from the workpiece. The outer edge 28 and inner edge 30 of adjacent ribs 24 are connected by a ramp surface 32 sloping away from the brake surface 26. As depicted in FIG. 10, both teeth 100 and ribs 24 contact the workpiece as it engages concave thread facing surface 22. It is this two place contact that provides an advantage to the rib and tooth configuration of this fastener.

It will be noted in FIGS. 1 and 5 that with normal clockwise or right-hand, motion of the fastener 10, the ribs 24 and teeth 100 are arranged such that the brake surfaces 26 and 101 have a tendency to be forced into the workpiece disposed under the head 16 of the fastener and provide a torque to resist rotation, while the counter-clockwise rotation of the fastener allows ramp surfaces 32 and 102 to glide along the workpiece, allowing for ease of rotation in that direction.

Referring to FIGS. 6 and 7, there is shown a threaded fastener 10a similar to fastener 10. With the exception of those elements to be described below, the fastener 10a is identical to the fastener 10 in all respects. The fastener 10a contains a plurality of ribs 34 and teeth 100a disposed about the periphery of the concave thread facing surface 22a the ribs being located in a similar manner to the ribs 24 and teeth 100 on the concave thread facing surface 22 of the fastener 10. However, in the fastener 10a, the ribs 34 and teeth 100a are disposed in reverse fashion to the ribs 24 in that each of the ribs and teeth contains a brake surface 36 and 101a. Ribs 34 have an outer edge 38 for contacting the work surface when the fastener 10a is driven into the workpiece, and an inner edge 40 spaced from the work surface. A ramp surface 42 extends from the outer edge 38 to the inner edge 40 of an adjacent rib 34, sloping in the opposite direction from the ramp surface 32 of the fastener 10. Teeth 100a have brake surfaces 101a and ramp surfaces 102a. It, therefore, will be obvious that rotation of the fastener 10a in the clockwise or right-hand direction will cause the ramp surface 42 to glide over the material as the fastener is being inserted into the workpiece after contact with the work surface, while counter rotation of the fastener will cause the outer edge 38 to be forced into the material of the workpiece surface and a braking, or locking action will occur in the counter-clockwise direction of rotation of the fastener.

Referring now to FIGS. 9 and 10, the threaded fastener 10 is shown in its application to a workpiece W having a work surface S, into which the threaded fastener 10 is applied. As the threaded fastener 10 moves into the workpiece W the concave thread facing surface 22 approaches the surface S as shown in FIG. 9. As depicted in FIG. 10, when the fastener is driven to its final position in the workpiece W, the uppermost portion of the thread form 14 is effective to pull that portion of the workpiece W adjacent the shank 12 of the fastener upwardly and in to the envelope formed by the concave surface 22. The effect of this is to provide a two point gripping force whether in the direction of counter rotation or in the direction of rotation of the fastener (depending on use of the fastener 10 or fastener 10a respectively), one point of gripping being teeth 100 or 100a at the periphery of the skirt 20 where the brake surface 26 contacts the material in the surface S of the workpiece W, and the second point being adjacent the shank 12 of the fastener where the periphery of the opening in the workpiece W again contacts the brake surface 26 of each rib 24. This is considered to give a much greater gripping action in that the force of rotation of the fastener is concentrated at two line contact points, both at the periphery of the skirt 20, and at the edge of the opening in the workpiece W.

Reference should now be directed to FIGS. 11, 12 and 13 where there is shown a novel die structure for producing the head 16 of the fastener 10 through the employment of a single blow from a header, which may be any of the type well-known in the art employed for forming the heads of threaded fasteners. The die set comprises a cupped hex insert 44 and a hex pin 46 which fits within the hex insert to form the top portion of the head 16 of the fastener 10. A heading die 48 is provided to complete the die set, the heading die 48 comprising a convex portion 50 having a plurality of serrations 52 formed thereon. The serrations 52 are of a configuration to form either the ribs 24 or ribs 34 and teeth 100 or 100a when pressed into a metal blank, as will be seen.

The cupped hex insert 44 is provided with a concave surface 54 which is dimensioned such that the upper surface of the skirt portion 20 adjacent the hex surface portion 18 of the fastener is formed when a blank of metal is forced into the concave surface.

As shown in FIG. 13, with the die set suitably installed in a header of a type well-known in the art, a metal blank is inserted into the central opening in the heading die 48 and into the cupped hex insert 44 with a space S maintained between the heading die and the cupped hex insert. The hex pin 46 is forced into the cupped hex insert with a blow sufficient to expand the metal into the space between the convex portion 50 of the heading die 48 and the concave surface 54 of the cupped hex insert 44. The resultant product is a threadless shank having a head 16 as shown in either FIGS. 1 through 5 described above, or FIGS. 6 and 7 depending on the configuration chosen for the serrations 52. The threadless shank may now be threaded by any manner well known in the art, and the fastener is complete without further operation on the head 16, or the addition of washers or other devices to provide a braking action when the fastener is rotated.

Figure 17:
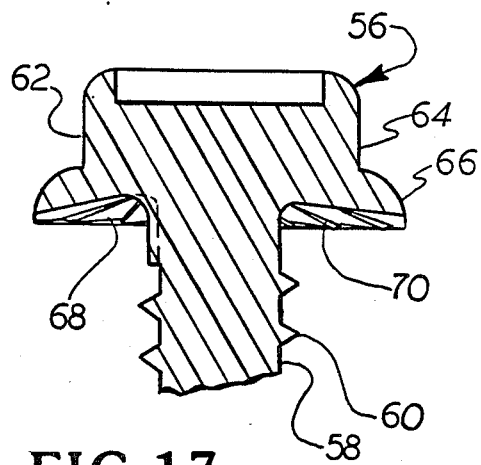
FIG. 17 is an elevational sectional view similar to FIG. 4 showing the structure of FIG. 1 modified to include the structural details of FIGS. 14 through 16.

In FIGS. 14 through 17 a threaded fastener 56 is shown providing an alternate construction to that described in FIGS. 1 through 10. The threaded fastener 56 has a shank 58 with a thread form 60 provided thereon (in FIGS. 16 and 17) and a head 62 with a hex surface portion 64. The fastener 56 is similar to the threaded fastener 10 or 10a in that the head has a skirt portion 66 extending radially outwardly from the head and a concave thread facing surface 68 as best shown in FIG. 17. The concave thread facing surface 68 has formed thereon a plurality of ribs 70 culminating in teeth 110 of the type shown in FIGS. 1 through 5 which are provided to form a braking surface when the fastener is rotated in the clockwise direction against a workpiece.

Figure 14:
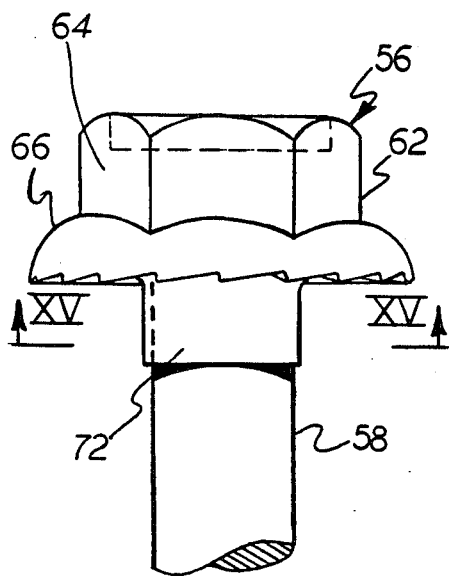
FIG. 14 is a fragmentary elevational view showing a fastener blank embodying a modification of the present invention.
Figure 16:
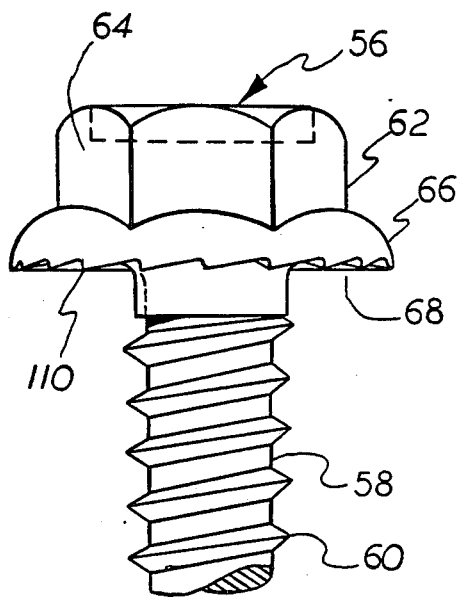
FIG. 16 is a fragmentary elevational view similar to FIG. 14 showing the blank of FIG. 14 having the threads formed thereon.
Figure 15:
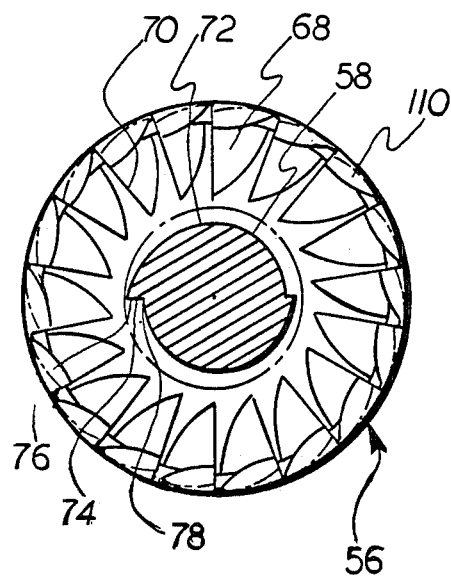
FIG. 15 is a sectional view taken along the lines XV—XV of FIG. 14 showing details of the structure of FIG. 14.

Referring to FIGS. 14 and 15, which show the fastener 56 prior to rolling the thread form 60 thereon, it will be noted that an enlarged diameter shank portion 72 extends downwardly from the thread facing surface 68 the enlarged diameter shank portion being formed during the heading process as described above. The enlarged diameter shank portion 72 is formed such that a pair of braking surfaces 74 are produced thereon by extending the braking surface of a rib 70 onto the shank portion 72. Each brake surface 74 has an outer edge 76 for contacting a workpiece into which the fastener is installed and an inner edge 78 spaced from the workpiece edge. Thus, when the fastener is inserted into an opening the brake surface 74 will be forced into the material of the workpiece when the fastener is rotated in the right-hand or clockwise direction but will glide over the material when the fastener is rotated in the opposite direction. As will be noted in FIG. 16, the thread form 60 when rolled under the fastener is formed onto the enlarged shank portion 72 thereby providing a slight increase in major diameter of the thread form for two to three pitches under the head of the fastener 56. It has been found that this is advantageous in bringing the material up onto the braking surfaces 74, and in forcing the material upwardly under the head to contact the concave thread facing surface 68.

While two braking surfaces 74 are shown, it should be obvious that any number may be provided about the periphery of the shank 58, although it has been found that two or three are ideal to provide the proper braking action in the workpiece.

It should also be brought out that should one desire a fastener with a locking action rather than a torque limiting action, the ribs shown in the structure of FIGS. 6 and 7 would be employed and the brake surfaces 74 would be constructed facing in the opposite direction, or in the direction corresponding to the ribs on the concave thread forming surface of that particular fastener.

Figure 18:
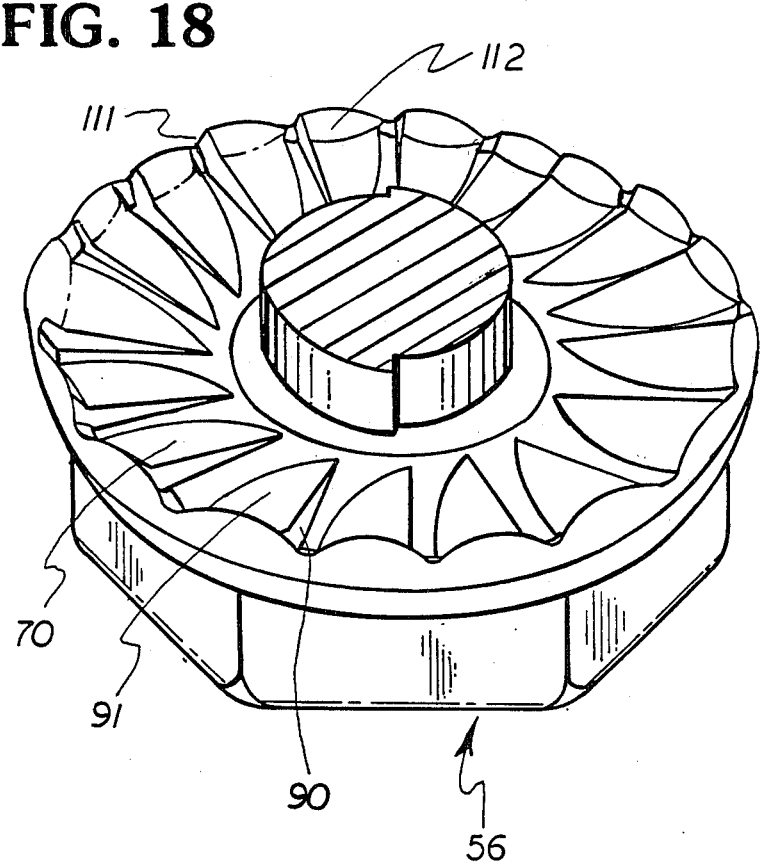
FIG. 18 is an isometric view depicting the under side of the head of the fastener of FIGS. 14 to 17 with the shank portion removed.

Referring to FIG. 18, ribs 70 and teeth 110 are depicted in greater detail. Ribs 70 contain braking surface 90 and ramp surface 91. Teeth 110 are shaped like teeth 100 described above and also contain brake surface 111 and ramp surface 112.

We claim:

1. A threaded fastener comprising an elongated shank on which a helical thread form is disposed, a workpiece entering portion of said shank disposed at one end thereof and a tool accommodating head disposed at the opposite end of said shank, and having a concave thread facing surface extending radially outwardly from the centerline of said shank beyond said helical thread form, a plurality of ribs disposed on said thread facing surface of said fastener and spaced circumferentially about the centerline of said shank under said head and positioned to contact a workpiece through which said workpiece entering portion of said shank is inserted upon rotation of said helical threads in said workpiece, each of said ribs comprising a brake surface extending radially outwardly from a point adjacent to the intersection of the outer periphery of said shank and said thread facing surface and having an outer edge for contacting said workpiece and an inner edge spaced from said outer edge in a direction away from said workpiece and a ramp surface sloping from said brake surface outer edge away from said workpiece, each of said ribs culminating in a tooth-like projection located at the outer periphery of said thread facing surface and each tooth-like projection comprising a brake surface and a ramp surface facing said centerline which ramp surface of said tooth-like projection has the shape of a quartered portion of an ellipsoid; whereby rotation of said fastener in one direction causes said ramp surfaces to slide along said workpiece and rotation of said fastener in the opposite direction causes said brake surfaces to penetrate said workpiece producing a braking action.

2. The threaded fastener as set forth in claim 1 wherein said plurality of ribs are equally spaced, one from the other.

3. The threaded fastener of claim 1 wherein said teeth are equally spaced about the outer periphery of said thread facing surface.

4. A threaded fastener as set forth in claim 1 wherein the outer periphery of said concave surface defines a plane wherein said helical thread form substantially terminates, to provide an unthreaded portion of said shank disposed substantially within the envelope of said concave surface.

5. A threaded fastener as set forth in claim 1 wherein a plurality of ribs are disposed on said shank.

6. A threaded fastener as set forth in claim 5 wherein said plurality of ribs are equally spaced, one from the other.

7. A threaded fastener as set forth in claim 2 wherein the outer periphery of said concave surface defines a plane wherein said helical thread form substantially terminates, to provide an unthreaded portion with said shank disposed substantially within the envelope of said concave surface.

* * * * *